United States Patent [19]
Lemon et al.

[11] Patent Number: 5,007,309
[45] Date of Patent: Apr. 16, 1991

[54] AUTOMATIC TRANSMISSION CONTROL SYSTEM AND METHOD OF OPERATION

[75] Inventors: Robert W. Lemon, Farmington Hills; John Arzoian, Dearborn, both of Mich.

[73] Assignee: Rockwell International Corporation, Pittsburgh, Pa.

[21] Appl. No.: 363,653

[22] Filed: Jun. 8, 1989

[51] Int. Cl.⁵ .................. B60K 41/22; F16H 61/14
[52] U.S. Cl. .................................... 74/869; 74/867; 74/866; 192/3.58
[58] Field of Search ............... 192/3.3, 3.58; 74/866, 74/867, 869

[56] References Cited

U.S. PATENT DOCUMENTS

| | | | |
|---|---|---|---|
| 4,428,259 | 1/1984 | Kubo et al. | 74/867 |
| 4,476,747 | 10/1984 | Kawamoto | 74/869 |
| 4,494,423 | 1/1985 | McCarthy et al. | 74/867 |
| 4,558,612 | 12/1985 | Shimizu et al. | 74/869 X |
| 4,618,038 | 10/1986 | Ogasawara et al. | 192/3.58 |
| 4,640,394 | 2/1987 | Higaski et al. | 192/3.58 |
| 4,669,335 | 6/1987 | Matsuoka et al. | 74/866 |
| 4,677,879 | 7/1987 | Furusawa | 74/866 |
| 4,700,819 | 10/1987 | Nishikawa et al. | 192/3.58 |
| 4,727,774 | 3/1988 | Sumiya et al. | 74/869 |
| 4,833,946 | 5/1989 | Lemieux | 74/866 |
| 4,858,500 | 8/1989 | Harada et al. | 74/866 |
| 4,901,603 | 2/1990 | Ishikawa | 74/866 |

*Primary Examiner*—Leslie A. Braun
*Assistant Examiner*—Matthew Stavish

[57] ABSTRACT

A control system for an automatic transmission of a vehicle with a fluid torque converter having a bypass clutch, and a change gear assembly providing a variety of ratio changes on selective actuation of a plurality of friction engaging elements of the change gear assembly. The control system provides the selective engagement of three friction elements and the bypass clutch through the selective energization and de-energization of two solenoid operated valves and the selective actuation and de-actuation of three shift control valves.

5 Claims, 6 Drawing Sheets

AUTOMATIC TRANSMISSION CONTROL SYSTEM AND METHOD OF OPERATION

BACKGROUND OF THE INVENTION

1. Field of the Invention

This invention relates to an improvement in a control system for an automatic transmission combining a four element torque converter with a planatery gearing arrangement.

2. Description of the Related Art

In a conventional control system for an automatic transmission of a vehicle driven through a fluid-coupling such as a torque converter with a lockup clutch, gear shifts between a plurality of forward and reverse gear ratios are provided selectively changing the engagement state of a plurality of friction elements.

In transmission of the type controlled by electro/hydraulic controls, the sequential engagement and disengagement of the friction elements during a gear shift is controlled by the actuation and deactuation of associated shift control valves. The actuating and deactuation of the shift valves is, in turn, controlled by the energization and de-energization of solenoid valves associated with each of the shift valves.

In transmission control systems of this type, the lockup clutch is also selectively controlled by the actuation and deactuation of a lockup control valve which, in turn, is controlled by the energization and de-engerization of a lockup solenoid. The actuation and de-actuation of each of the solenoid valves in such a control system is controlled by a central processing unit which receives sensed inputs indicative of vehicle operation such as engine load and vehicle speed.

With an automatic transmission control system of this kind, it is desirable to decrease the weight and space taken up by the transmission control system while improving the efficiency of operation of the transmission.

The present invention seeks to achieve this objective by providing an improved transmission control system and method of operation which uniquely accomplishes the stated goal by using fewer components in the transmission control system. The use of fewer components in the control system of the transmission inherently reduces the weight of the transmission and the space taken up by the transmission control system, thereby increasing its operating efficency while maintaining operational reliability.

It is therefore an object of the present invention to provide an improved electro/hydraulic transmission control system having a reduced number of operative parts, and to provide a unique interrelationship between the existing parts of the transmission control system to produce a system which controls a transmission having a plurality of forward gear ratios and a torque converter lockup or direct drive condition.

SUMMARY OF THE INVENTION

The improved transmission of the present invention includes a four element torque converter with a lockup clutch for direct drive through the torque converter bypassing the fluid coupling. The torque converter is drivingly connected to a planatery gearing transmission.

Sequential actuation of a first clutch, a second clutch, a third clutch, a first brake and a second brake in the automatic transmission provides four forward speed ranges including a torque converter lockup or direct drive lockup condition.

The plurality of speed ranges and the direct drive lockup condition of the present automatic transmission are produced by an automatic transmission control system comprising a pump, primary and secondary regulator valves, a manual selector valve, a pulse width modulator valve, a range selector valve, a rear clutch relay valve, a lockup relay valve, a rear clutch solenoid valve, and a range solenoid valve.

The four forward speed ranges (including the direct drive lockup condition) of the subject transmission are produced by selective energization of the rear clutch solenoid valve and the range solenoid valve to control the actuation and de-actuation of the range selector valve, the rear clutch relay valve, the lockup relay valve, and the torque converter lockup valve.

The improved automatic transmission control system reduces the number of solenoid operated valves needed to control a four forward speed transmission, thereby decreasing the weight and space required for the automatic transmission control system while increasing the efficiency and maintaining the reliability of the automatic transmission control system. This provides a more cost effective method of controlling a transmission providing four forward speeds (including a direct drive lockup condition).

BRIEF DESCRIPTION OF THE DRAWINGS

Further objects and features of the present invention are revealed in the following description of the preferred embodiment of the invention and the drawings wherein.

DESCRIPTION OF THE PREFERRED EMBODIMENT

Figure 1:
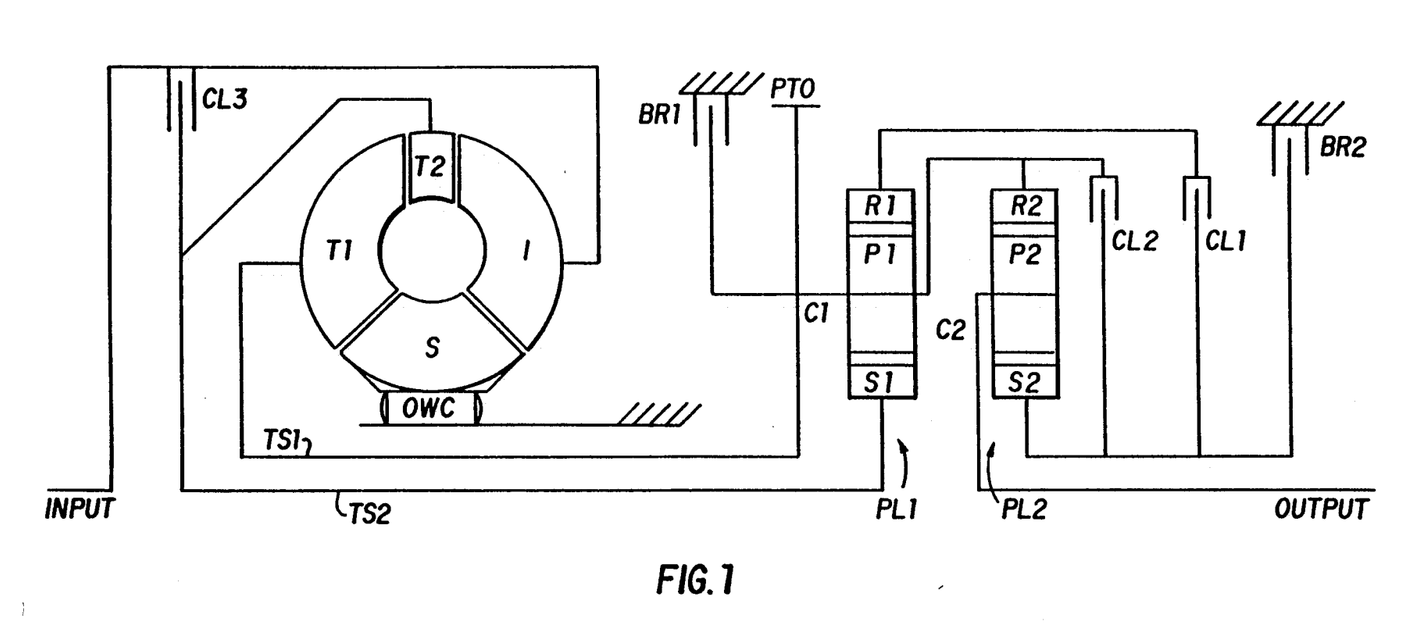
FIG. 1 shows a schematic drawing of the transmission embodying the present invention.
Figure 2:
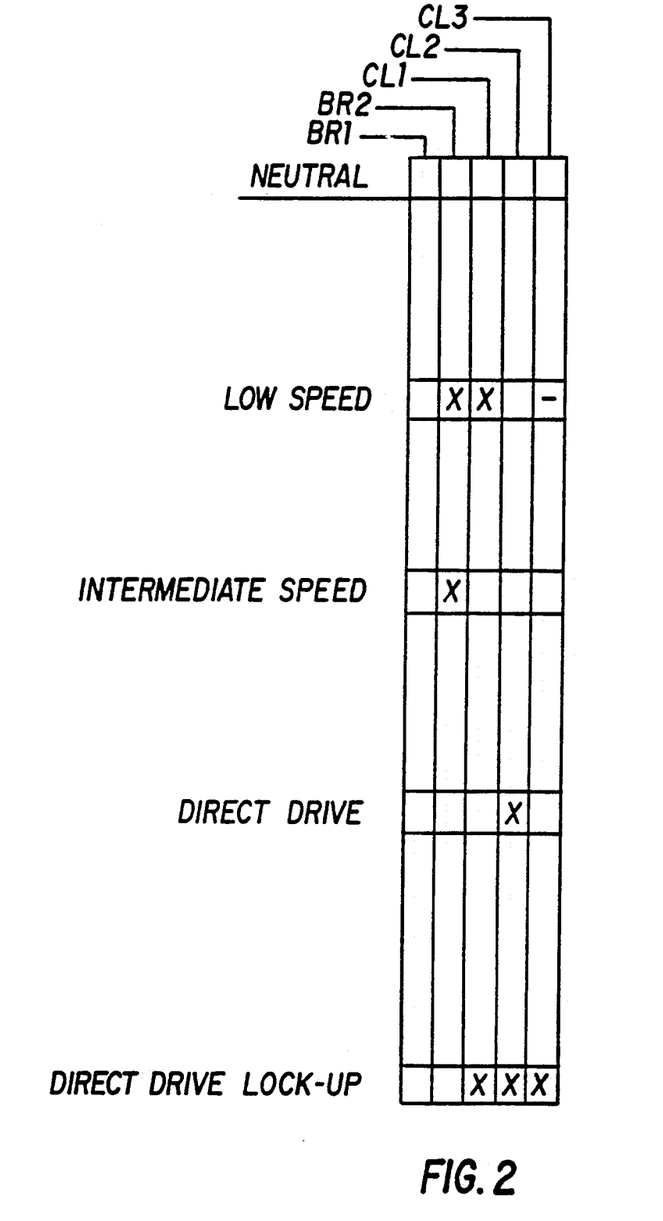
FIG. 2 shows a chart illustrating the brake and clutch engagement control conditions for the neutral range, the low speed range, the intermediate speed range, the direct range, and the direct drive lockup range.

The automatic transmission of the present invention is schematicall shown in FIG. 1 and comprises an input shaft (INPUT), an output shaft (OUTPUT), a four element torque converter having an impeller I, connected to the input shaft, a primary turbine T1 in fluid communication with the impeller, a secondary turbine T2, in fluid communication with the impeller I and a stator S in fluid communication with the impeller and the turbines. The impeller I, turbines T1, T2 and the stator S are arranged in a fluid flow circulating path in which the driven impeller I delivers fluid to the secondary turbine T2 and then to the primary turbine T1, and in which the fluid returns from the primary turbine T1 via the stator S to the impeller I.

The input shaft (INPUT) is driven by an engine (not shown) and rotates the impeller I, and the impeller produces fluid flow in the torque converter to drive the primary turbine T1 and the secondary turbine T2. The fluid then returns to the impeller via the stator. A one-way clutch OWC is connected between the stator S and the transmission housing.

First PL1 and second PL2 planatery gear sets are connected to the primary and secondary turbines, respectively. The first planatery gear set PL1 comprises a first sun gear S1, first planet gears P1, a first planet gear carrier C1, and a first ring gear R1. The second planetary gear set PL2 comprises a second sun gear S2, second planet gears P2, a second planet gear carrier C2, and a second ring gear R2.

In the first gear set PL1, the first planetary gear carrier C1 is connected to a first brake BR1 and to the primary turbine T1 through a primary turbine shaft TS1 for rotation therewidth, and the first sun gear S1 is connected to the secondary turbine T2 through a secondary turbine shaft TS2 for rotation therewith. The primary turbine T2 through a secondary turbine shaft TS2 for rotation therewith. The primary turbine T1 is also connected to a power take-off (PTO). A first friction clutch CL1 is connected between the first ring gear R1 and the second sun gear S2 and a second brake BR2. In the second planetary gear set PL2, the second ring gear R2 is connected to the first planet carrier C1, the second planet carrier C2 is connected to the output shaft (OUTPUT), and the second sun gear S2 is connected to the second brake BR2 and first and second friction clutches CL1, CL2. The second friction clutch CL2 connects the second sun gear S2 and the second brake BR2 to the second ring gear R2 and the first carrier C1 and selectively locks up the second planetary gear set PL2. As stated above, the first brake BR1 is connected to the primary turbine T1 and the first carrier C1. The second brake BR2 is connected to the first and second friction clutches CL1, CL2 and to the second sun gear S2. A third friction clutch CL3 connects the input shaft (INPUT) and the impeller I to the secondary turbine T2 and second turbine shaft TS2.

The improved automatic transmission hydraulic control system of the present invention is shown in FIGS. 3-6.

The improved hydraulic control system comprises a pump 1 which pumps control oil from the sump 2 through filter 3 and the fluid conduits 4, 5, 11 to the primary regulator valve 6 and the secondary regulator valve 13.

The primary regulator valve 6 operates in a conventional manner known in the art to maintain the pressure of the hydraulic fluid in the conduit 7 at a primary regulated pressure or lien pressure.

The secondary regulator valve 13 operates to maintain the pressure of the hydraulic fluid in the conduit 11 at a secondary regulated pressure or a converter pressure.

Figure 3:
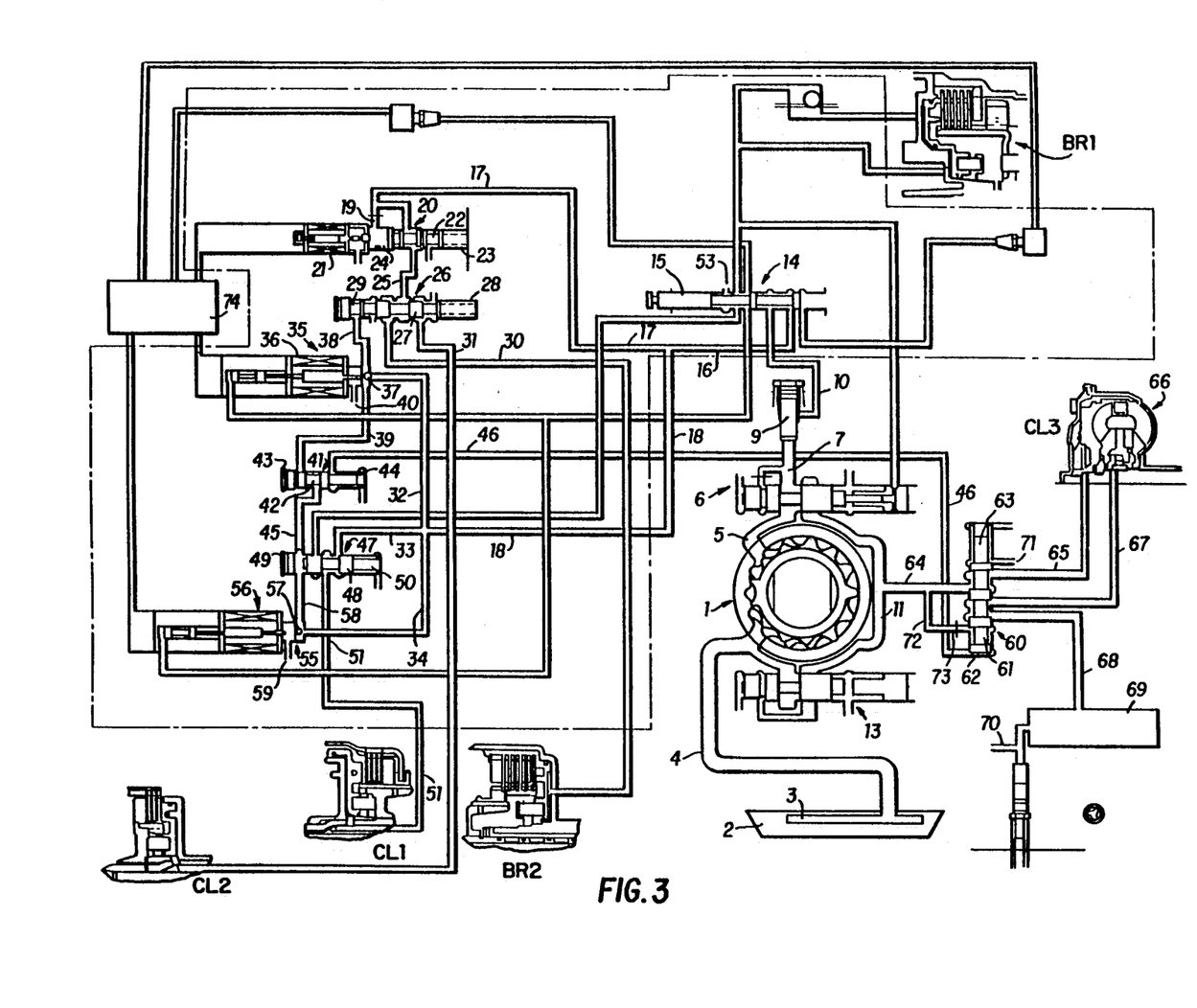
FIGS. 3, 4, 5 and 6 show schematic representations of the automatic control system of the present invention including the positioning of the valves for the low, intermediate, direct drive, and direct drive lockup speed ranges, respectively.

The hydraulic fluid supplied to conduit 7 passes through the filter 9 and the conduit 10 to the manual selector valve 14. The manual selector valve 14 comprises a spool 15 which can be moved by the operator of the vehicle to various operating positions including L, D, N or R positions. The manual selector valve selectively provides hydraulic fluid to a plurality of conduits, and a fluid drain 53. In FIG. 3, the manual selector valve 14 is in the D position and supplies hydraulic fluid from the conduit 10 to the conduit 16, and from the conduit 16 to the conduits 17 and 18.

The hydraulic fluid in the conduit 17 is supplied to a pulse width modulator valve 20 comprising a solenoid valve 21 controlling the opening of a drain, a spool 22, a spring 23 biasing the spool 22 in one direction and a fluid chamber 24 supplied with hydraulic fluid from the conduit 17 through a feedback passage 19 to move the spool 22 against the biasing force of spring 23 when the pulse width modulator valve 21 closes the drain valve.

The conduit 18 supplies hydraulic fluid to the conduits 32, 33 and 34. The conduit 32 supplies hydraulic fluid to the range solenoid valve 35. The range solenoid valve 35 comprises a solenoid 36 and a ball check valve 37 actuated by the solenoid 36 to seal the fluid conduit 32 from communicating with the fluid conduits 38 and 39, thereby permitting the conduits 38 and 39 to drain through the drain 40, or to seal the drain 40 from the fluid conduits 38, and 39 to permit the fluid conduits 38 and 39 to be supplied with hydraulic fluid from the conduit 32.

The conduit 38 communicates with range selector valve 26 comprising a spool 27 biased by a spring 28 and a fluid pressure chamber 29 communicationg with the fluid conduit 38. Fluid conduits 25, 30 and 31 also communicate with the range selector valve 26. The spring 28 biases the range selector valve spool 26 to its leftward position as shown in FIG. 3 when the conduit 38 is drained through the drain 40. When the conduit 38 is supplied with hydraulic fluid from the conduit 32, it delivers hydraulic fluid under pressure to the chamber 29 which forces the spool of the range selector valve 27 to the right against the bias of the spring 28.

The fluid conduit 39 communicates with the lockup relay valve 41 which comprises a valve spool 42 biased by a spring 44 to the left as seen in FIG. 3. A fluid chamber 43 communicates with the fluid conduit 39. When the ball check valve 37 seals the conduit 39 from the drain 40, hydraulic fluid is supplied from the conduit 32 to the conduit 39 and the pressure chamber 43 to force the spool 42 of the lockup relay valve 41 to the right as seen in FIG. 3 against the bias of the spring 44. This communicates the conduit 45 with the conduit 46. When the lockup relay valve is in its deactuated position as shown in FIG. 1, the communication of conduit 45 with conduit 46 is interrupted.

Fluid conduit 34 provides hydraulic fluid to the rear clutch solenoid valve 55. The rear clutch solenoid valve 55 comprises a solenoid 56 that actuates a ball check valve 57 to interrupt communication between the conduit 34 and conduit 58 permitting the conduit 58 to drain through the drain 59, or de-actuates the ball check valve 57 by sealing the drain 59 from the conduits 34 and 58 and permitting fluid communication between the conduits 34 and 58.

Figure 4:
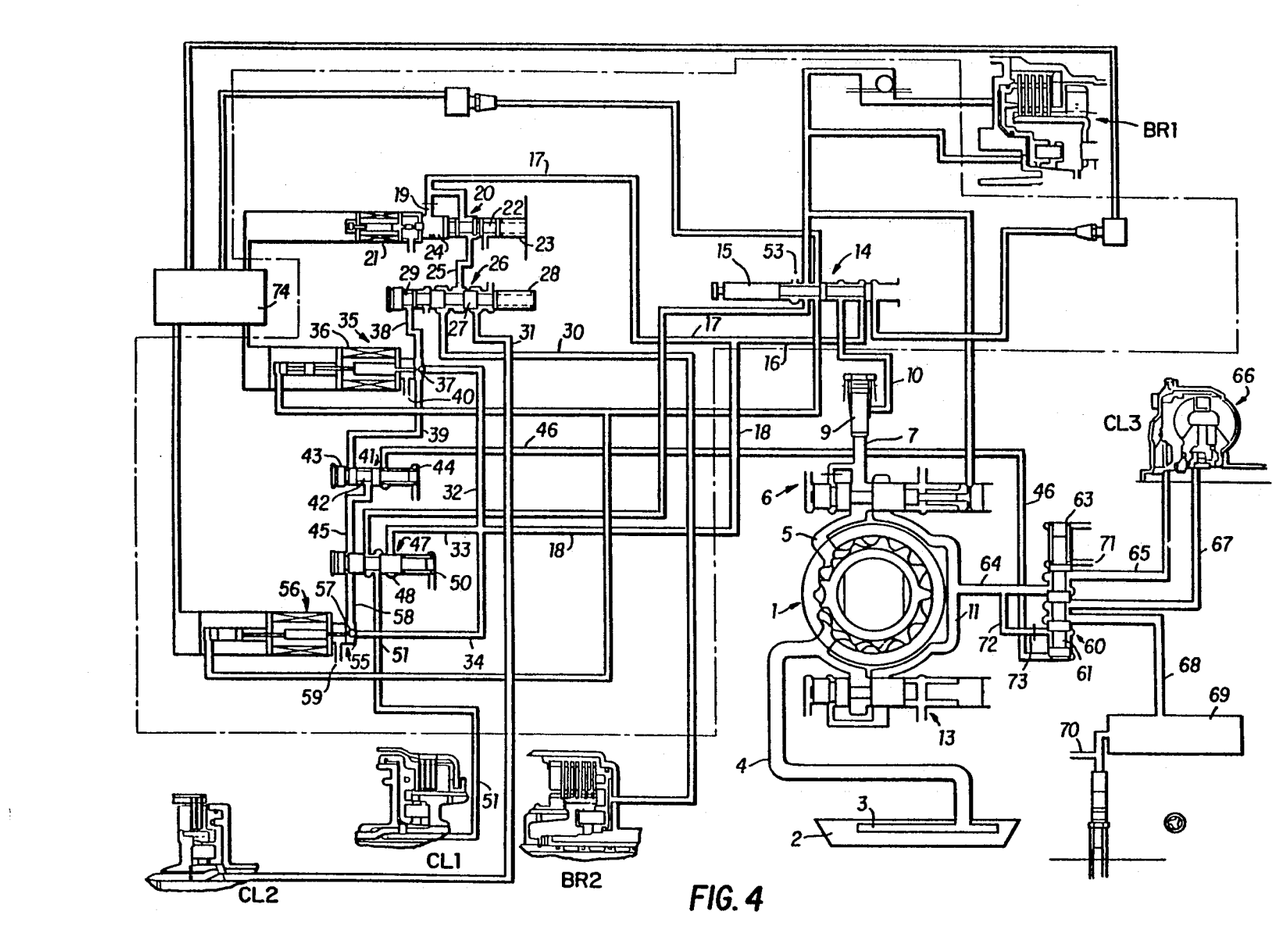

The fluid conduit 33 provides hydraulic fluid to the rear clutch relay valve 47. The rear clutch relay valve comprises a spool 48 biased to the left as seen in FIG. 4 by the spring 50. When fluid chamber 49 of the rear clutch relay valve spool 48 is supplied with fluid pressure from the conduit 58, the rear clutch relay valve spool 48 is moved to the right as shown in FIG. 3 against the bias of the spring 50. In the position of the rear clutch relay valve spool 48 shown in FIG. 3, conduit 33 is communicated with the conduit 51.

When the conduit 45 is communicated with the conduit 46, conduit 46 provides hydraulic fluid to the torque converter lockup valve 60. The torque converter lockup valve 60 comprises a spool 61 biased in a downward position as shown in FIG. 3 by a spring 63. In the position shown in FIG. 3, hydraulic fluid having a secondary regulated pressure or converter pressure is supplied from conduit 11 to conduit 64, through the torque converter lockup valve 60, to the conduit 65 and the torque converter 66, disengaging the torque converter lockup clutch CL3. The hydraulic fluid returns from the torque converter through the conduit 67, the torque converter lockup valve 60, and the conduit 68 to the cooler 69 and a lubricating circuit 70.

Figure 6:
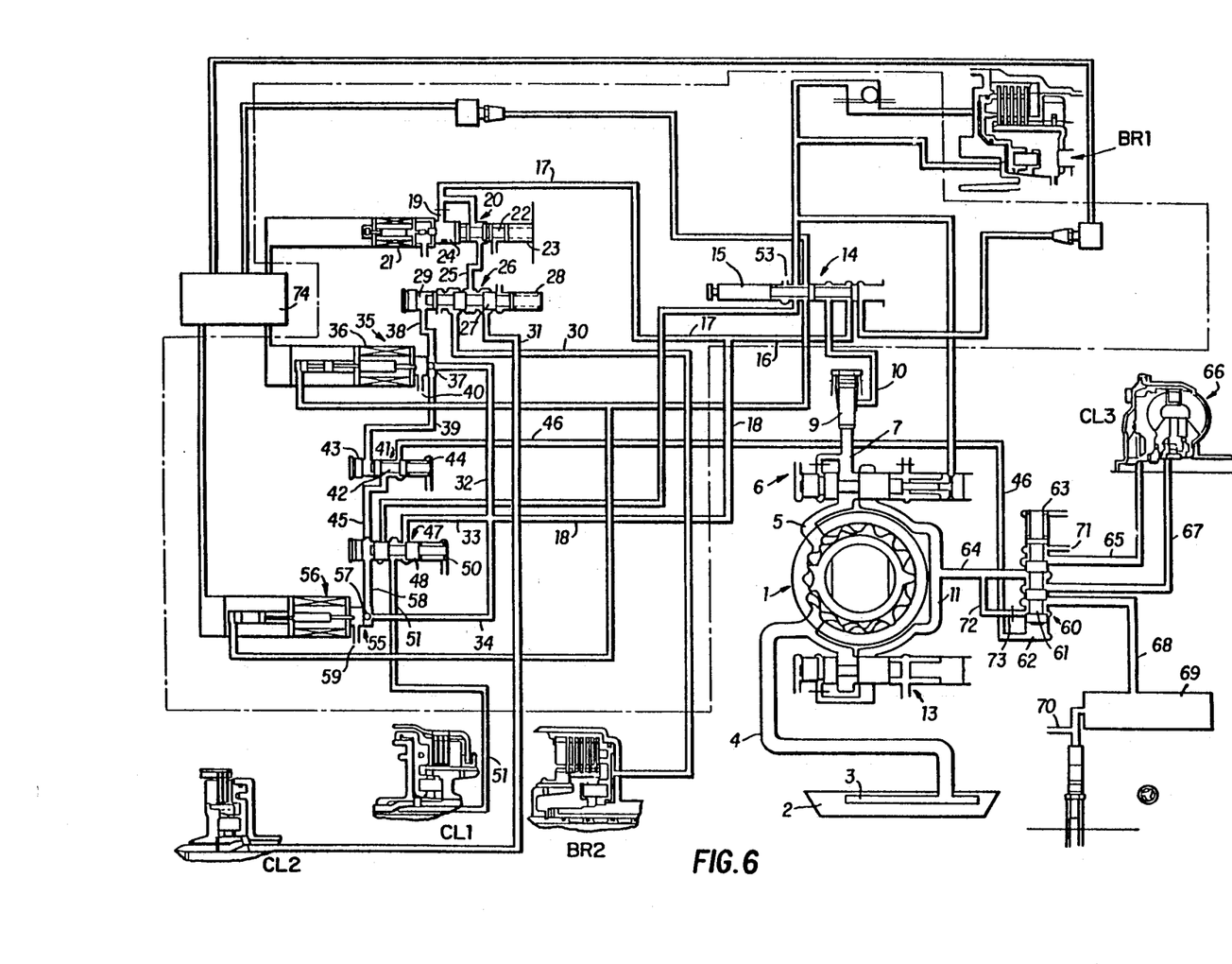

When hydraulic fluid is supplied through the conduit 46 to the chamber 62, the hydraulic fluid pressure in chamber 62 displaces the torque converter lockup valve 60 to its upward position as shown in FIG. 6. In this position, hydraulic fluid under converter pressure is supplied through the conduit 64, the torque converter lockup control valve 60, the conduit 67, to the torque converter 66 to engage the torque converter lockup clutch CL3. The conduit 65 is connected to the drain 71 through the torque converter lockup valve 60. A portion of the hydraulic fluid under converter pressure is supplied from the conduit 64 through the conduit 72, the orifice 73, the torque converter lockup valve 60, the conduit 68, and the cooler 69 to the lubricating circuit 70.

Operation of the improved transmission control system during forward driving, with the manual selector valve in the D positin, will now be described. The operation of the control system with the manual selector valve in other positions will not be disscussed since this is not the subject of the present invention. In operation, when the manual selector valve is in the D position, the computer 74 receives input information indicative of the operating conditions of the vehicle such as engine load and vehicle speed, and controls the pulse width modulator valve 20, the range solenoid 35, and the rear clutch solenoid valve 55 in such a manner as to select the optimum gear ratio of the automatic transmission for the current operating conditions of the vehicle.

The pulse width modulator valve 20 receives hydraulic fluid through conduit 17 and is controlled by the computer 74 to produce a modulated control oil pressure in the conduit 25. The four forward speed shifts can now be accomplished by the controlling of range solenoid valve 35 and rear clutch solenoid valve 55.

FIG. 3 shows the positions of the valve elements of the improved automatic transmission contrl system when the computer 74 has selected the low speed gear ratio of the automatic transmission of the invention. In the low speed range, primary line pressure is supplied by the primary regulator valve 6 to the fluid conduits 7 and 10, through the manual selector valve 14 to the fluid conduits 16, 17, 18, 32, 33 and 34.

The range solenoid 35 is de-energized, causing the ball check valve 37 to seal the conduits 38 and 39 from the fluid supplied in the fluid conduit 32. This results in the range selector valve 26 and the lockup relay valve 41 being biased to their leftward positions as shown in FIG. 3 by the springs 28 and 44, respectively. With the range selector valve 26 in its leftward position, the modulated control oil in the conduit 25 is directd to the conduit 30, and through the conduit 30 to the low range brake BR2 engaging the brake.

The rear clutch solenoid valve 55 is controlled by the computer 74 in the low range to energize the rear clutch solenoid 56 resulting in the ball chect valve 57 sealing the conduits 34 and 58 from the drain 59 and permitting hydraulic fluid to be supplied from the conduit 34 to the conduit 58. The hydraulic fluid in conduit 58 is supplied to the pressure chamber 49 of the rear clutch relay valve 47.

The pressure of the hydraulic fluid supplied to the pressure chamber 49 of the rear clutch relay valve 47 causes the spool 48 of the rear clutch relay valve to move to its rightward position against the bias of spring 50 as shown in FIG. 3. In this position of the rear clutch relay valve spool 48, the fluid conduit 33 communicates through the rear clutch relay valve 47 with the fluid conduit 51. Hydraulic fluid is supplied from the fluid conduit 33, through the rear clutch relay valve 47, to the fluid conduit 51 and the rear clutch CL1 engaging the clutch.

With the rear clutch CL1 and the low range brake BR2 both engaged, the automatic transmission is in condition for low range speed ratio operation.

FIG. 4 shows the positions of the valve elements of the improved automatic transmission control system for operation in the intermediate drive range of the transmissio.1. When the computer 74 determines from the input information indicative of operating conditions that the transmission is to operate in the intermeadiate speed range, the computer 74 controls the range solenoid valve 35 to maintain the solenoid 36 in its de-energized position, it controls the rear clutch solenoid valve 55 to de-energize the solenoid 56, and it continues to control the pulse width modulator valve 20 to provide a modulated control oil pressure to the conduit 25 in much the same manner as provided in the low range speed ratio.

With the range solenoid valve 35 remaining in its de-energized condition, the range selector valve 26 and the lockup relay valve 41 remain positioned to the left as shown in FIG. 4 in their deactivated positions.

With the range selector valve 26 in its deactuated leftward position as seen in FIG. 4, modulated control oil continues to be supplied from the pulse width modulator valve 20 through the conduit 25, the range selector valve 26, the conduit 30 to the low range brake BR2 engaging the brake.

With the rear clutch solenoid valve 55 being de-energized in the intermediate speed range, the ball check valve 57 interrupts the fluid conduit 34 from communication with the fluid conduit 58, and causes the fluid conduit 58 to drain through the drain 59. This removed the fluid pressure in the pressure chamber 49 of the rear clutch relay valve 47 and causes the spool 48 of the rear clutch relay valve 47 to move to its leftward, deactuated position from the bias of spring 50. In this position, the rear clutch relay valve 47 interrutps fluid communication between the fluid conduit 33 and the fluid conduit 51, thereby releasing the rear clutch CL1.

With the low range brake BR2 engaged and with the release of the previously engaged rear clutch CL1, the automatic transmission is now in condition to provide the intermediate speed range.

Figure 5:
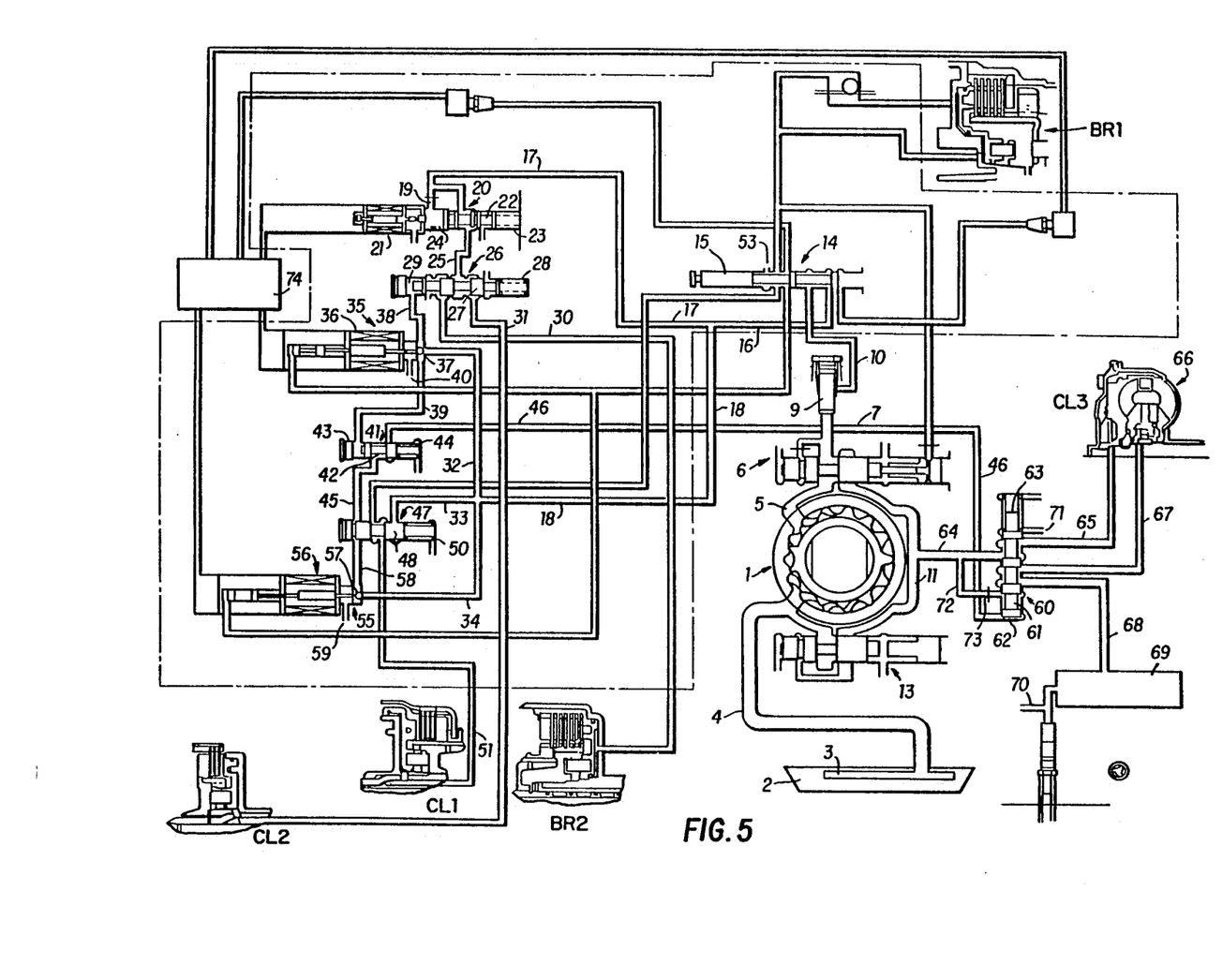

When the computer 74 determines, baised upon the input information of the vehicle operating conditions, that the automatic transmission control system is to shift the transmission to the direct drive range, the range solenoid valve 35 is energized and the rear clutch solenoid valve 55 is maintained in its de-energized position as shown in FIG. 5.

With the range solenoid valve 35 energized, the ball check valve 37 seals the fluid conduits 38 and 39 from the drain 40, and permits fluid communication between the conduits 38, 39 and 32.

The hydraulic fluid in the conduit 32 is directed through the conduit 38 to the pressure chamber 29 of the range selector valve 26. The fluid pressure in chamber 29 causes the spool 27 of the range selector valve to move to its rightward, actuated position against the bias of spring 28. In the actuated position of the range selector valve 26, the modulated control oil pressure produced by the pulse width modulator valve 20 in the fluid conduit 25 is directed through the range selector valve 26 to the fluid conduit 31 and through the fluid conduit 31 to the front clutch CL2 engaging the clutch. The fluid pressure in conduit 30 is drained from the low range brake BR2 through the conduit 30 and the range selector valve 26.

The hydraulic fluid pressure in the conduit 32 is also directed through the conduit 39 to the fluid pressure chamber 43 of the lockup relay valve 41. This causes the spool 42 of the lockup relay valve 41 to move rightward to its actuated position against the bias of the spring 44, thereby communicating the fluid conduit 45 with the fluid conduit 46. However, because the rear clutch solenoid valve 55 is deactuated, the conduits 46, 45 and 58 are all connected with the drain 59.

When the computer 74 determines, based on the input operating conditions of the vehicle, that the automatic transmission is to be operated in the direct drive lockup range, the computer energizes both the range solenoid valve 35 and the rear clutch solenoid valve 55 as shown in FIG. 6.

With the range solenoid valve 35 energized, the range selector valve 26 and the lockup relay valve 41 are both moved to their actuated positions as in the direct drive speed range.

The ball check valve 37 of the range solenoid valve 35 is moved to a position to interrupt communication of the fluid conduits 32, 38 and 39 with the drain 40. Hydraulic fluid in conduit 32 is supplied through the conduit 38 to the pressure chamber 29 of the range selector valve 26. The pressure in fluid chamber 29 causes the spool 27 of the range selector valve 26 to move rightwardly to its actuated position against the bias of spring 28. This communicates the modulated control oil produced by the pulse width modulator valve 20 in the conduit 25 with the fluid conduit 31, and the front clutch CL2 engaging the clutch. As in the direct drive range, the fluid pressure in conduit 30 is drained from the low range brake BR2 through the conduit 30 and the range selector valve 26.

Fluid pressure in conduit 32 is also supplied to the conduit 39 and the pressure chamber 43 of the lockup relay valve 41. This causes the spool 42 of the lockup relay valve 41 to move to its rightward, actuated position against the bias of spring 44. With the rear clutch solenoid valve 55 energized, the ball check valve 57 interrupts fluid communication between the fluid conduits 34 and 58 with the fluid drain 59. The fluid pressure in conduit 34 is directed through the conduit 58 to the pressure chamber 49 of the rear clutch relay valve 47. The fluid pressure in fluid pressure chamber 49 causes the spool 48 of the rear clutch relay valve 47 to move to its rightward, actuated position against the bias of spring 50. This communicates the fluid conduit 33 with the fluid conduit 51 and hydraulic fluid is directed through the conduit 33, the rear clutch relay valve 47 and the conduit 51 to the rear clutch CL1 engaging the clutch.

Fluid pressure supplied through fluid conduit 34 is also directed through fluid conduit 58 to the fluid conduit 45 and the lockup relay valve 41. With the lockup relay valve 41 in its rightward, actuated position, the hydraulic fluid in fluid conduit 45 is directed through the lockup relay valve 41 and the fluid conduit 46 to the pressure chamber 62 of the torque converter lockup valve 60.

The hydraulic fluid pressure in pressure chamber 62 of the torque converter lockup valve 60 causes the spool 61 of the lockup valve to be displaced to its upward position as shown in FIG. 6 against the bias of spring 63. In the actuated position of the torque converter lockup valve 60, secondary regulated pressure or converter pressure in fluid conduit 11 is directed through the fluid conduit 64 to fluid conduit 67 and the torque converter 66, engaging the torque converter lockup clutch CL3. The fluid conduit 65 is drained through the drain 71. A portion of the converter pressure in the fluid conduit 64 is also directed through the conduit 72, the orifice 73, the fluid conduit 68 and the cooler 69 to a lubrication circuit 70.

With the rear clutch CL1, the front clutch CL2 and the torque converter lockup clutch CL3 all engaged, the automatic transmission is in condition to provide the direct drive lockup speed range or drive condition.

While the present invention has been described by reference to a specific embodiment, it should be understood that modifications and variations of the invention may be constructed without departing from the scope and spirit of the invention as defined in the following claims.

What is claimed is:

1. A method of controlling the operation of an automatic transmission of a vehicle having a fluid torque converter with a bypass clutch connecting a drive shaft from a prime mover to an output shaft of a speed change gear assembly of the transmission and a plurality of friction engaging elements arranged in the speed change gear assembly to provide a plurality of forward speed ratios between the input shaft and the output shaft of the speed change gear assembly upon selective engagement of the engaging elements by selectively enabling or preventing the flow of fluid from a source of pressurized fluid through two passages in a hydraulic circuit by controlling only two solenoid values in response to signals generated by a central processing unit that processes input signals derived from sensed vehicle operating parameters comprising:

opening the second passage to the source of pressurized fluid to cause engagement of first and second friction engaging elements to produce a first forward drive gear condition while maintaining the first passage closed;

closing both passages from the source of pressurized fluid to cause engagement of only the first friction engaging element to produce a second forward drive gear condition;

opening the first passage to the source of pressurized fluid while maintaining the second passage closed to the pressurized fluid to engage only a third friction engaging element to produce a third forward drive gear position;

and opening both of the passages to the source of pressurized fluid to engage the second and third friction engaging elements along with the torque converter bypass clutch to produce a fourth, direct drive lockup forward drive condition.

2. A hydraulic control system for controlling the operation of an automatic transmission of the vehicle having a fluid torque converter with a bypass clutch connecting a drive shaft from a prime mover to an input shaft of a speed change gear assembly of the transmission and a plurality of friction engaging elements arranged in the speed change gear assembly to provide a plurality of forward speed ratios between the input shaft and the output shaft of the speed change gear assembly upon selective engagement of the friction engaging elements by means of the energizing and de-energizing of two solenoid valves in response to a control signal generated by an electronic central processing unit that processes input signals derived from sensed operating parameters of the vehicle, the hydraulic control system comprising:

a manual selector valve for shifting the transmission to one a plurality of drive positions, said manual selector valve having an input conduit for receiving pressurized fluid from a pump and an output conduit;

first and second shift control valves receiving pressurized fluid from said output conduit when said manual selective valve is shifted to a forward drive position;

first and second solenoid operated valves arrange to receive control signals produced by said central processing unit and to produce shift signals in response to the control signals received, said first solenoid operated valve being located in a hydraulic line interconnected between said output conduit and said first shift control valve for shifting said shift control valve between first and second operating positions, said second solenoid operated valve being located in a hydraulic line interconnected between said output conduit and said second control valve for shifting said second shift control valve between first and second operating positions;

first, second and third friction engaging elements for shifting said transmission between a plurality of forward speed ratios, said first friction engaging element being arranged to receive fluid pressure from said output conduit in response to movement of said second shift control valve to its second operating position, said second and third shift friction engaging elements being arranged to receive fluid pressure from said output conduit in response to movement of said first shift control valve between its first and second operating positions respectively, whereby shifting of only said first and second shift control valves by energizing and de-energizing said first and second solenoid control valves controls the engagement states of said first, second and third friction-engaging elements and shifting of the transmission.

3. A hydraulic control system as claimed in claim 2 further including a third shift control valve located in the hydraulic line between said solenoid control valve and the torque converter bypass clutch to control the flow of pressurized fluid to said bypass clutch in order to provide an additional forward speed ratio, said third shift control valve being arranged pressurized fluid from said output conduit by means of said second solenoid valve and to be shifted between first and second operations positions by means of said first solenoid valve.

4. A hydraulic control system as claimed in claim 3 further comprising a pulse width modulator valve arranged to control oil pressure supplied to said first shift control valve, said pulse width modulator valve arranged to be controlled in response to signals generated by said central processing unit.

5. A method of controlling the operation of an automatic transmission of a vehicle having a fluid torque converter with a bypass clutch connecting a drive shaft from a prime mover to an output shaft of a speed change gear assembly of the transmission and a plurality of friction engaging elements arranged in the speed change gear assembly to provide four forward speed ratios between the input shaft and the output shaft of the speed change gear assembly upon selective engagement of the engaging elements by the selective shifting of first, second and third shift control valves, each being shiftable between at least two operating positions in a hydraulic circuit by controlling two solenoid valves in response to signals generated by a central processing unit that processes input signals derived from sensed vehicle operating parameters comprising:

shifting the second shift control valve to its second operating position while maintaining the first and third shift control valves in their first operating position in order to cause engagement of first and second friction engaging elements to establish a first forward speed ratio;

maintaining each of the three shift control valves in their first operating positions in order to cause engagement of only the second friction engaging element to establish a second forward speed ratio;

shifting at least first shift control valve to its second operating position while maintaining at least the second shift control valve in its first operating position in order to cause engagement of only the third friction engaging element to establish a third forward speed ratio; and shifting all three shift control valves to their second operating positions in order to cause engagement of the first, third and a fourth friction engaging element to establish a fourth forward speed ratio.

* * * * *